United States Patent [19]

Orbach

[11] Patent Number: 5,760,684
[45] Date of Patent: Jun. 2, 1998

[54] DEVICE FOR PROMTPING USE OF VEHICLE SEATBELTS

[75] Inventor: Israel Orbach, Zichron, Israel

[73] Assignee: OR-ROT-TEK Ltd., Petah, Italy

[21] Appl. No.: 659,127

[22] Filed: Jun. 4, 1996

[30] Foreign Application Priority Data

Jun. 15, 1995 [IL] Israel ........................................ 114165

[51] Int. Cl.⁶ ..................................................... B60R 22/00
[52] U.S. Cl. ...................... 340/457.1; 340/457; 340/686; 200/61.58 B; 180/268; 280/801.1
[58] Field of Search ........................... 340/457, 457.1, 340/438, 686, 687, 689; 200/61.58 B; 180/268; 280/801.1, 808; 297/481, 482, 483

[56] References Cited

U.S. PATENT DOCUMENTS

| | | | |
|---|---|---|---|
| 4,727,358 | 2/1988 | Burt, III | 340/384.1 |
| 4,755,789 | 7/1988 | Paschal | 340/457.1 |
| 4,849,733 | 7/1989 | Conigliaro et al. | 340/457.1 |
| 4,973,106 | 11/1990 | Strovinskas | 297/482 |
| 5,109,199 | 4/1992 | Berger | 324/415 |
| 5,463,369 | 10/1995 | Lamping | 340/457.1 |
| 5,483,221 | 1/1996 | Matter et al. | 340/457.1 |

*Primary Examiner*—Edward Lefkowitz
*Attorney, Agent, or Firm*—Mark M. Friedman

[57] ABSTRACT

A device for prompting the use of a vehicle seatbelt. The device includes a sensor and an alarm. The sensor is attached to the seatbelt so that it assumes a first angular position when the seatbelt is in an inoperative position and a second angular position when the seatbelt is in an operative position. The sensor includes a motion sensor responsive to motion of the vehicle when the sensor is in the first angular position. The sensor generates a signal indicative of motion of the vehicle occurring while the sensor is in the first position. The alarm is responsive to the signal and generate an alarm to prompt use of the seatbelt.

5 Claims, 4 Drawing Sheets

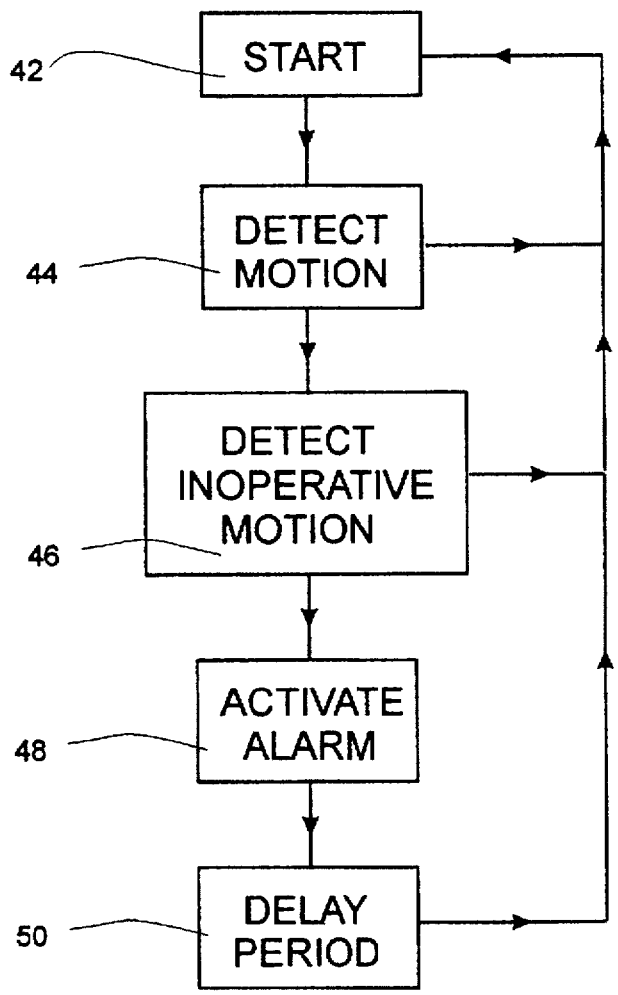
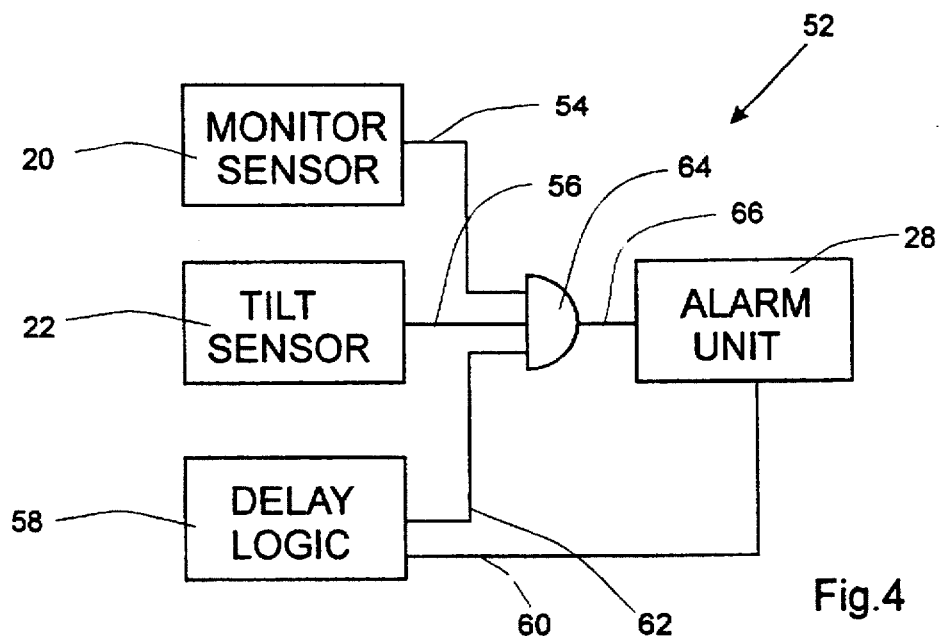

5,760,684

DEVICE FOR PROMTPING USE OF VEHICLE SEATBELTS

FIELD AND BACKGROUND OF THE INVENTION

The present invention relates to safety restraints and, in particular, to devices for prompting the occupants of a vehicle to use seatbelts.

It is known that the use of safety restraints in cars and other vehicles greatly reduces fatalities and serious injuries in the event of an accident. Although seatbelts are now commonly fitted in all modern cars, drivers and passengers frequently forget to use them.

In order to remind people to use the seatbelts provided, some cars are provided with seatbelt warning systems. These systems generally provide a visual and/or audible warning signal typically from the moment the car ignition is activated until the seatbelts are fastened. Such systems employ a sensor within the seatbelt locking mechanism, as well as sensors within the seats of the car for sensing the presence of a driver and/or passenger. These sensors are all connected by means of wires to the seatbelt warning system. The entire system is, in turn, connected to the car ignition system.

Seatbelt warning systems of this type require specially designed seatbelt locking mechanisms, mounting of special sensors within the seats, and extensive wiring. As a result, they are expensive, difficult to service, and highly unsuitable for retrofitting to a car not originally fitted with such a system.

There is therefore a need for an inexpensive, easily fittable device for prompting the use of a vehicle seatbelt.

SUMMARY OF THE INVENTION

The present invention is of a device for prompting use of a vehicle seatbelt.

According to the teachings of the present invention there is provided, a device for prompting the use of a vehicle seatbelt, the seatbelt being deployable from an inoperative position to an operative position, the device comprising: (a) a sensor unit attachable to the seatbelt so that the sensor unit assumes a first angular position when the seatbelt is in the inoperative position and a second angular position when the seatbelt is in the operative position, the sensor unit including a motion sensor responsive to motion of the vehicle when the sensor unit is in the first angular position, the sensor unit generating a signal indicative of motion of the vehicle occurring while the sensor unit is in the first position; and (b) an alarm unit associated with the sensor unit, the alarm unit being responsive to the signal to generate an alarm to prompt use of the seatbelt.

According to a further feature of the present invention, there is also provided a tilt sensor effective to prevent the motion sensor from generating the electrical signal when the sensor unit is in the second angular position.

According to a further feature of the present invention, the motion sensor is implemented as a tilt-dependent motion sensor.

According to a further feature of the present invention, there is also provided a delay system, connected to the alarm unit, for preventing repetition of the alarm for a predetermined time period after a previous generation of the alarm.

According to a further feature of the present invention, the predetermined time period is in the range from about half-an-hour to about an hour.

BRIEF DESCRIPTION OF THE DRAWINGS

The invention is herein described, by way of example only, with reference to the accompanying drawings, wherein:

FIG. 3 is a block diagram illustrating the principles of operation of the device of FIG. 1;

FIG. 4 is a logic circuit for use in the device of FIG. 1;

DESCRIPTION OF THE PREFERRED EMBODIMENTS

The present invention is of a device for prompting use of a vehicle seatbelt.

The principles and operation of the device according to the present invention may be better understood with reference to the drawings and the accompanying description.

Figure 1:
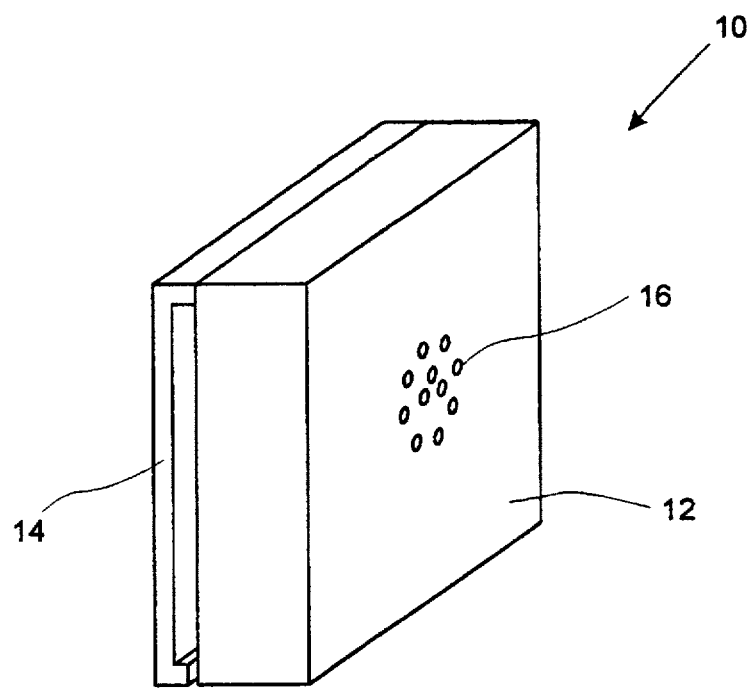
FIG. 1 is a schematic perspective view of a first embodiment of a device for prompting use of a seatbelt, the device constructed and operative according to the teachings of the present invention.
Figure 2:
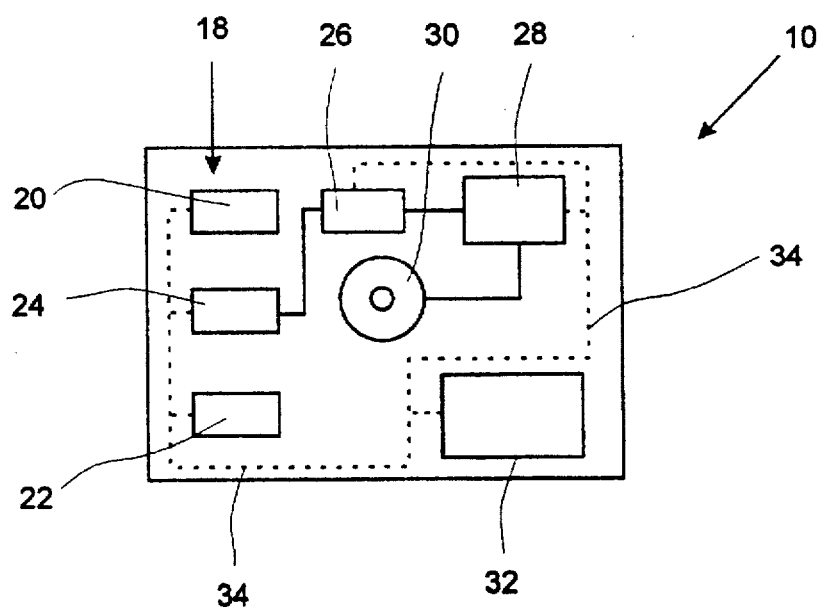
FIG. 2 is a schematic cross-sectional plan view of the device of FIG. 1.
Figure 5A:
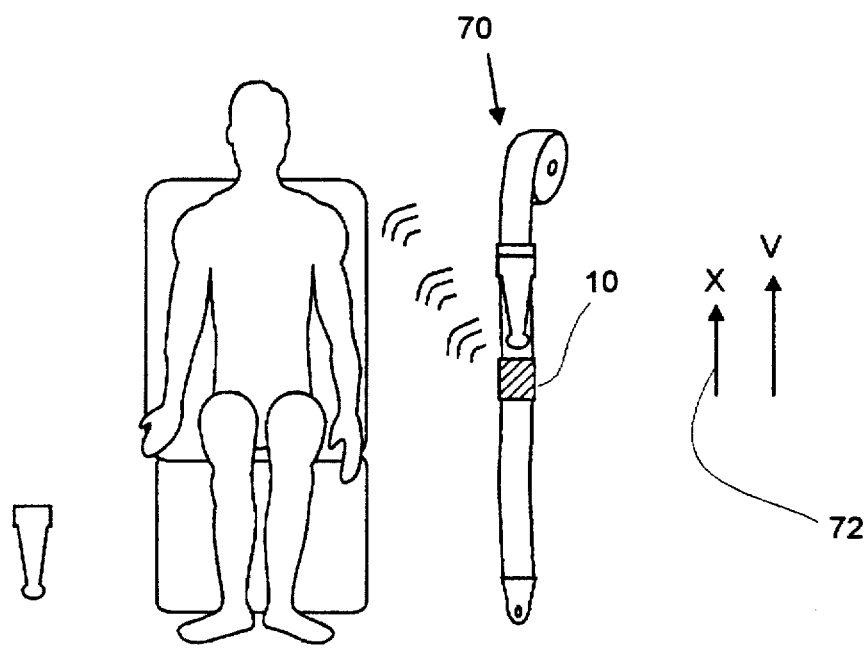
FIG. 5A is a schematic view of the device of FIG. 1 attached to a seatbelt which is in an inoperative position.
Figure 5B:
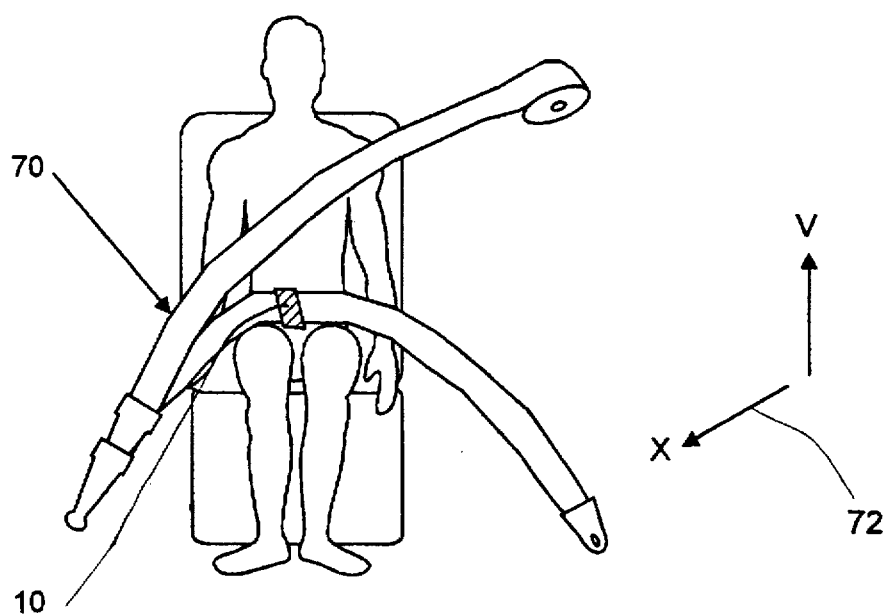
FIG. 5B is a schematic view of the device of FIG. 1 attached to a seatbelt which is in an operative position.

Referring now to the drawings, FIGS. 1 and 2 show a first embodiment of a device, generally designated 10, constructed and operative according to the teachings of the present invention, for prompting the use of a vehicle seatbelt. Generally speaking, device 10 includes a sensor unit and an alarm unit. The sensor unit is attachable to the seatbelt so that it assumes a first angular position when the seatbelt is in its inoperative position, i.e., not connected, (FIG. 5A), and a second angular position when the seatbelt is in its operative position, i.e., when connected so as to restrain a passenger, (FIG. 5B). The sensor unit includes a motion sensor which is responsive to motion of the vehicle when the sensor unit is in the first, inoperative, angular position to generate an electrical signal. The alarm unit is responsive to the electrical signal to generate an alarm reminding the user to engage the seatbelt.

FIG. 3 illustrates the principles of operation of device 10. Operation of device 10 starts when it is initially attached to a vehicle seatbelt with a battery or other suitable electrical power supply in place. This initial stage of operation is represented by block 42. Device 10 then begins to detect motion (block 44) of the vehicle indicative of current or imminent use. Motion, in this context, refers to both translational movement and to vibrations such as are produced when a vehicle engine is started. If no motion is detected, device 10 returns to start 42. If motion is detected, device 10 then checks the angular position of the seatbelt, indicative of whether the seatbelt is in use or connected/engaged (block 46). If the seatbelt is in use, device 10 returns to start 42. If the seatbelt is not in use, an alarm is activated (block 48) to prompt the user to connect the seatbelt. After activation of an alarm 48, device 10 becomes inactive for a delay period (block 50), typically of from about ½–1 hour, thereby preventing unwanted repetition of the alarm, before returning to start 42. It should be noted that the logical order of these steps is not uniquely defined. For example, the order of blocks 44 and 46 may be reversed without changing the overall operation of device 10.

Referring now to the structural features of device 10 more specifically, FIG. 1 shows the exterior of device 10. Device 10 has a housing 12 which contains the functional components of device 10. Housing 12 may be made of any suitable materials including, but not limited to, molded plastics, thin metal or other light materials. Device 10 also features an attachment mechanism 14 for attaching device 10 to a seatbelt. Attachment mechanism 14, as depicted in FIG. 1, is a clip, but various other mechanisms for attaching device 10 may be used. Examples include elastic straps, compact clamping mechanisms of all kinds, bolts, and various types of adhesive. Preferably, attachment mechanism 14 is attached to the seatbelt removably, semi-permanently or permanently without damaging the integrity of the seatbelt. It is a particular feature of attachment mechanism 14 that it prevents rotation of device 10 relative to the seatbelt, so that the angular position of device 10 is directly correlated to that of the seatbelt. Preferably, attachment mechanism 14 is also designed to produce a defined orientation of device 10 relative to the seatbelt. For example, a portion of attachment mechanism 14 may be shaped to abut an edge of the seatbelt so as to align device 10 at a specific angle relative to the seatbelt. This insures correct positioning of the tilt sensor of device 10, as will be described below.

A number of perforations 16 may be provided in housing 12 for increasing the transmission of an audible alarm through housing 12. If a visual alarm signal is to be provided either in addition to, or as an alternative for, an audible alarm, at least one electric bulb with a transparent protective cover (not shown) is built into housing 12. Housing 12 is preferably also provided with an easily removable battery compartment lid (not shown) to enable easy replacement of an internal battery.

FIG. 2 shows the internal components of device 10. A sensor unit 18 includes a motion sensor 20 and a tilt sensor 22, both connected to a processor 24. Processor 24 is connected through a delay system 26 to an alarm unit 28 with a speaker 30. A battery 32 supplies electrical power to each component through a system of wires or rails represented by dashed lines 34.

Motion sensor 20 may be any type of motion or vibration sensor. The sensitivity of motion sensor 20 is such that, when device 10 is fitted in a vehicle, normal vibration caused by wind or passing cars while the vehicle is stationary will not be detected, whereas movement of the vehicle itself will be detected. Preferably, the sensitivity is tuned such that the opening of the vehicle doors will not be detected, but the closing of the doors, or the starting of the vehicle ignition will be detected.

Tilt sensor 22 may be any type of tilt sensor or inclination meter. In a preferred embodiment, tilt sensor 22 provides a simple yes/no indication of whether a line defined as the axis of tilt sensor 22 is within a given range relative to the vertical. Typically, this range is between about ±150 and ±200. Preferably, tilt sensor 22 is symmetrical on inversion, meaning that it will indicate "close to vertical" if the axis is within either the range ±15° or the range 165°–195° to an upward vertical. This enables device 10 to be installed in either sense relative to the direction of the seatbelt. Alternatively, a more sophisticated attitude meter may be used. In this case, processor 24 is programmed appropriately to analyze the output from the sensor to determine whether the attitude of device 10 lies within the range of interest.

Tilt sensor 22 is mounted within device 10 such that, when device 10 is mounted on a seatbelt in its inoperative position, the axis of tilt sensor 22 is approximately vertical. Typically, in the case of conventional inertia-reel seatbelts in which the inoperative position is approximately vertical, the axis of tilt sensor 22 is aligned approximately parallel to the length of the seatbelt. In certain embodiments, tilt sensor 22 is mounted on a rotatable base so that it can be aligned for use on non-standard seatbelt types. Alternatively, tilt sensor 22 is self-calibrating, setting its axis to be the vertical of its current position. The self-calibration may be actuated either manually on installation of device 10 or automatically in the event of the orientation remaining constant for a period of a number of hours.

Processor 24 processes the outputs of motion sensor 20 and tilt sensor 22 to generate an electrical signal indicative of failure to use a seatbelt. In its simplest form, processor 24 is a simple combination of logic gates, or even a single logic gate, producing a signal when motion sensor 20 detects motion, indicating that the vehicle is in use, and tilt indicator 22 indicates that the seatbelt is in an inoperative position. Alternatively, a similar function may be performed by a simple combination of electronic components. Where more sophisticated sensors are used, processor 24 is designed to analyze the output from the sensors to extract the required information. Processor 24 may additionally analyze the output of motion sensor 20 to distinguish between different types of motion. Processor 24 may also control self-calibration of tilt sensor 22, as described above.

Delay system 26 serves to prevent repetition of an alarm for a predetermined time interval after a previous alarm. This feature serves to prevent annoying recurrence of an ineffective alarm signal, for example, from a seatbelt belonging to a seat which is not in use. Preferably, the predetermined time period is in the range of from about half-an-hour to about an hour, thereby covering the duration of most journeys. When no alarm has been produced within this time period, delay system 26 is inactive, allowing any signal produced by processor 24 to pass directly to alarm unit 28. Once a signal has reached alarm unit 28, delay system 26 effectively blocks transmission of further alarm signals until the predetermined time period has elapsed.

Alarm unit 28 is responsive to the electrical signal from processor 24 to generate an alarm to prompt use of the seatbelt. Typically, the alarm is an audible alarm produced through speaker 30, or some other audio signal generator, such as a transducer or bell. Preferably, alarm unit 28 generates a short series of spaced pulses or spaced multiple pulses. Alarm unit 28 may additionally, or alternatively, be connected to a light bulb (not shown) for producing a visual alarm signal.

It should be appreciated that the specific interconnection of the components as shown in FIG. 2, as well as the subdivision of processor 24, delay system 26 and alarm unit 28, are somewhat arbitrary. For example, delay system 26 could be implemented as a feedback loop receiving an input from alarm unit 28 and providing a third input to a slightly modified processor 24, without changing the functionality of the components. Similarly, processor 24, delay system 26 and alarm unit 28 may be combined into a single microprocessor chip.

Referring now to FIG. 4, there is shown a possible logic circuit, generally designated 52, for use in device 10. Logic circuit 52 may be used in a case that motion sensor 20 produces a binary output 54 wherein "1" represents motion and "0" represents lack of motion, and that tilt sensor 22 produces a binary output 56 wherein "1" represents a near-vertical angular position corresponding to an inoperative position of a seatbelt and "0" corresponds to an operative position of a seatbelt.

Logic circuit 52 exemplifies an alternative implementation of delay system 26 as delay logic 58. In this case, delay logic 58 receives an input 60 from alarm unit 28 indicative of alarm unit 28 having been activated. Delay logic 58 produces a binary output 62 which takes the value 0 for the predetermined time period after activation of alarm 28, and 1 at other times. Outputs 54, 56 and 62 are combined in a triple AND-gate 64 which supplies a binary input 66 to alarm unit 28. In the event that outputs 54, 56 and 62 all take the value 1, indicating the presence of motion, an inoperative position of the seatbelt and the required delay period since the last alarm, input 66 will take the value 1, thereby activating alarm unit 28.

The use of device 10 will now be described with reference to FIGS. 5A and 5B. FIG. 5A shows device 10 attached to a seatbelt 70 in an inoperative position. As described above, device 10 is attached to seatbelt 70 such that, when seatbelt 70 is in an inoperative position, tilt sensor 22 of sensor unit 18 is in a first angular position relative to the vertical, V.

For purposes of illustration, line 72 represents an axis x defined relative to tilt sensor 22 such that, when tilt sensor 22 is attached to seatbelt 70 in an inoperative position, axis x is approximately parallel to vertical V. This alignment may be achieved either by alignment of device 10 with seatbelt 70 when it is first attached, or by self-calibration of tilt sensor 22 after attachment, as mentioned above. As long as seatbelt 70 is not in use, axis x remains within a defined range of angles, typically from between about ±15° and about ±200, from vertical V. Within this range, tilt sensor 22 allows motion sensor 20 to generate an electrical signal to activate an alarm in response to certain amounts and/or types of motion, as described above.

FIG. 5B shows device 10 attached to a seatbelt 70 in an operative position. In this position, sensor unit 18 is in a second angular position such that axis x is rotated significantly out of alignment with vertical V. Tilt sensor 22 is then effective in preventing motion sensor 20 from actuating an alarm, as described above.

It should be noted that, since tilt sensor 22 is typically sensitive to inclinations of more than about ±15° and about ±20°, most of belt 70 will tilt sufficiently between its operative and inoperative positions to allow correct functioning of device 10. Thus, device 10 may be attached to almost any part of seatbelt 70 which is exposed in the inoperative position. Alternatively, device 10 may be attached to a seatbelt buckle, or any other part of a seatbelt assembly whose orientation varies sufficiently between the seatbelt's operative and inoperative positions.

Figure 6A:
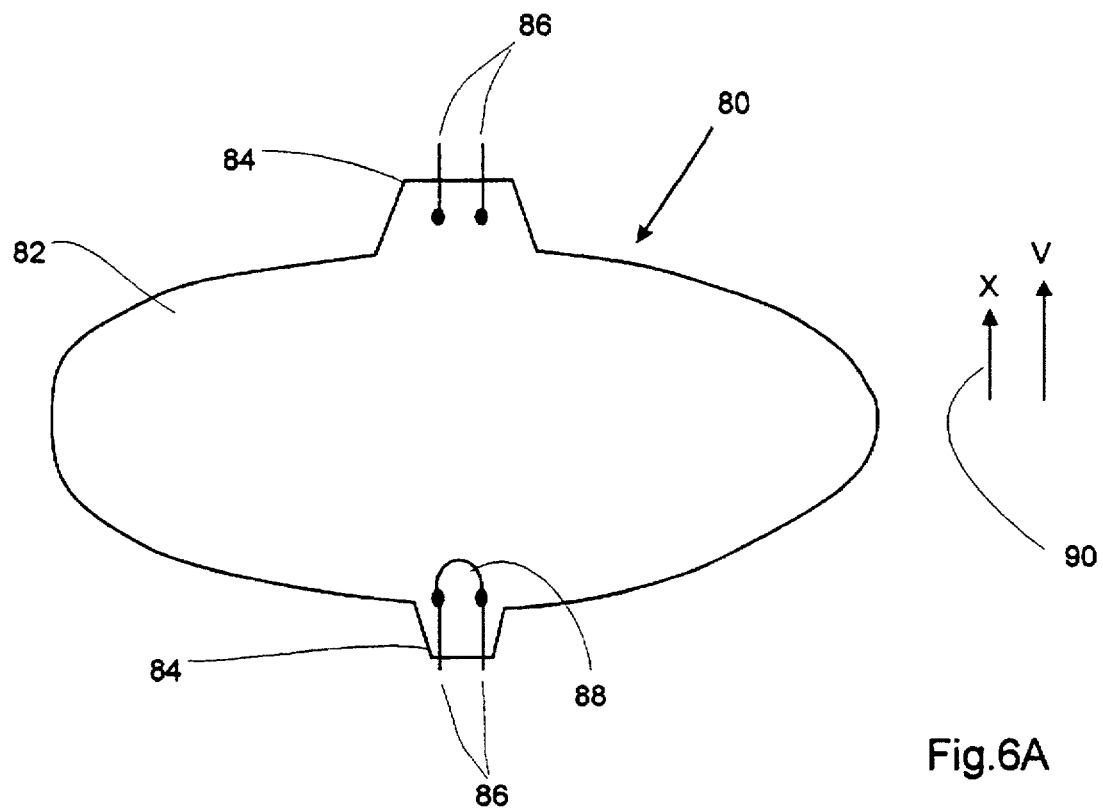
FIG. 6A is a schematic cross-sectional view of a tilt-dependent motion sensor for use in a second embodiment of a device for prompting use of a seatbelt, the device constructed and operative according to the teachings of the present invention, the tilt-dependent motion sensor being shown in a first angular position.
Figure 6B:
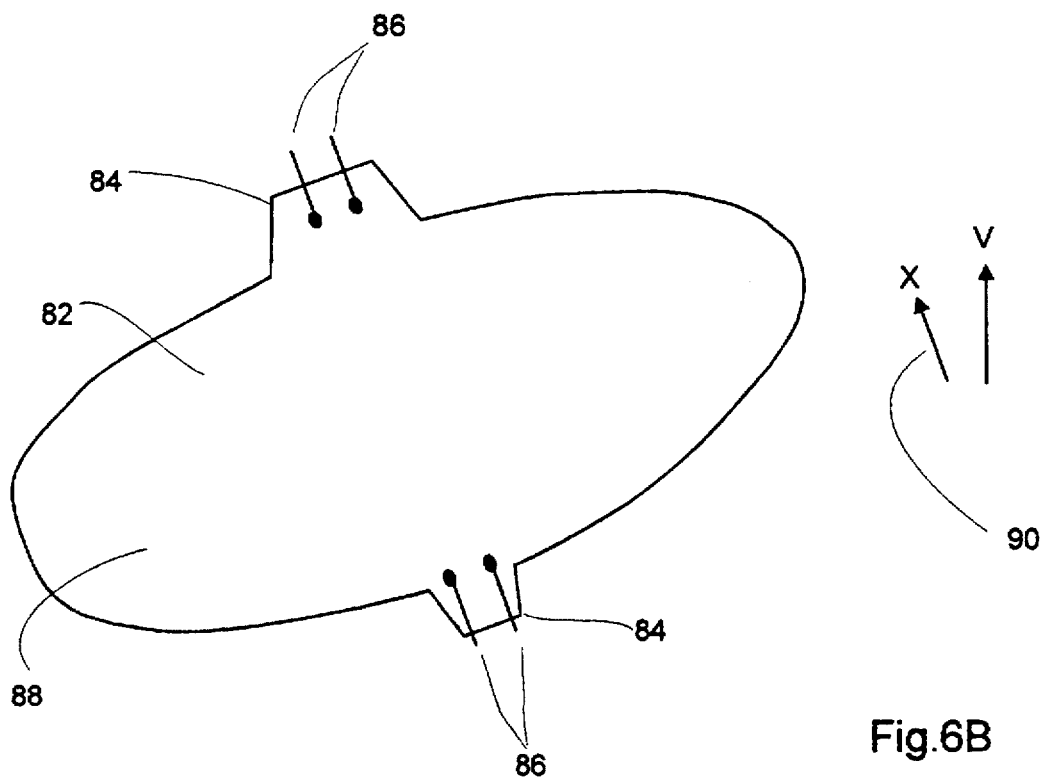
FIG. 6B is a schematic cross-sectional view of the tilt-dependent motion sensor of FIG. 6A in a second angular position.

With reference now to FIGS. 6A and 6B, a second embodiment of a device, constructed and operative according to the teachings of the present invention, for prompting use of a vehicle seatbelt will be described. This second embodiment is similar in structure and identical in function to the first embodiment described above, differing only in that motion sensor 20 and tilt sensor 22 are now replaced by a single tilt-dependent motion sensor.

FIG. 6A shows a tilt-dependent motion sensor, generally designated 80, constructed and operative according to the teachings of the present invention, for use in the second embodiment of a device for prompting use of a vehicle seatbelt. Sensor 80 has a bulb-like hollow body 82 with two recesses 84. Each recess 84 is provided with at least two electric contacts 86. A conductive ball 88 is free to move within body 82. For purposes of illustration, a line 90 represents an axis x defined relative to sensor 80 such that it is parallel to a line through both recesses 84. A vertical V is also shown.

Body 82 is shaped so that, when sensor 80 is in a first angular position as shown in FIG. 6A, i.e., that axis x is within a given range of angles from vertical V, conductive ball 88 rolls into one of recesses 84. Conductive ball 88 thus lies in contact with electric contacts 86 thereby completing an electric circuit (not shown). In this position, movement or vibration of sensor 80 causes momentary loss of contact between conductive ball 88 and electric contacts 86, thereby breaking and recompleting the electric circuit. In this embodiment, processor 24 includes a combination of electronic components or logic circuitry responsive to repeated opening and closing of a circuit to generate an electric signal to activate alarm unit 28.

FIG. 6B shows sensor 80 in a second angular position in which axis x is outside the given range of angles from vertical V. Body 82 is shaped so that, when sensor 80 is in this second angular position, conductive ball 88 rolls away from recesses 84, thereby avoiding contact with electric contacts 86. Thus, vibration and movement of sensor 80 while in this position will not result in completion of the electric circuit, and will not cause processor 24 to activate alarm unit 28.

It will now be apparent that motion sensor 20 and tilt sensor 22 of the first embodiment of the present invention may be replaced by sensor 80, requiring only minor adaptation of processor 24, and without changing the functionality of the device. Hence, in all other respects, the structure and operation of the second embodiment of the present invention may be understood by analogy from the above drawings and description of the first embodiment.

It will be understood that the present invention has been described, by way of example, in a limited number of embodiments. Many other variations may be made without departing from the scope and the spirit of the present invention.

What is claimed is:

1. A device for prompting use of a vehicle seatbelt, the seatbelt being deployable between from an inoperative position to an operative position, the device comprising:

(a) a sensor unit attachable to the seatbelt so that said sensor unit assumes a first angular position when the seatbelt is in the inoperative position and a second angular position when the seatbelt is in the operative position, said sensor including a motion sensor responsive to motion of the vehicle at least when said sensor unit is in said first angular position, said sensor unit generating a signal indicative of motion of the vehicle occurring while said sensor unit is in said first angular position; and (b) an alarm unit associated with said sensor unit, said alarm unit being responsive to said signal to generate an alarm to prompt use of the seatbelt.

2. The device of claim 1, further comprising a tilt sensor effective to prevent said motion sensor from generating said electrical signal when said sensor unit is in said second angular position.

3. The device of claim 1, wherein said motion sensor is implemented as a tilt-dependent motion sensor.

4. The device of claim 1, further comprising a delay system, connected to said alarm unit, for preventing repetition of said alarm for a predetermined time period after a previous generation of said alarm.

5. The device of claim 4, wherein said predetermined time period is in the range from about half-an-hour to about an hour.

* * * * *

UNITED STATES PATENT AND TRADEMARK OFFICE
CERTIFICATE OF CORRECTION

PATENT NO. : 5,760,684
DATED : June 2, 1998
INVENTOR(S) : Israel ORBACH

It is certified that error appears in the above-identified patent and that said Letters Patent is hereby corrected as shown below:

On the title page, item [54] and Column 1, in the title, change "PROMTPING" to -- PROMPTING --.

Signed and Sealed this

Eighth Day of December, 1998

Attest:

BRUCE LEHMAN

Attesting Officer     Commissioner of Patents and Trademarks